No. 748,569. PATENTED JAN. 5, 1904.
A. R. ANDERSON.
FRICTION CLUTCH.
APPLICATION FILED JULY 7, 1902.
NO MODEL. 2 SHEETS—SHEET 1.
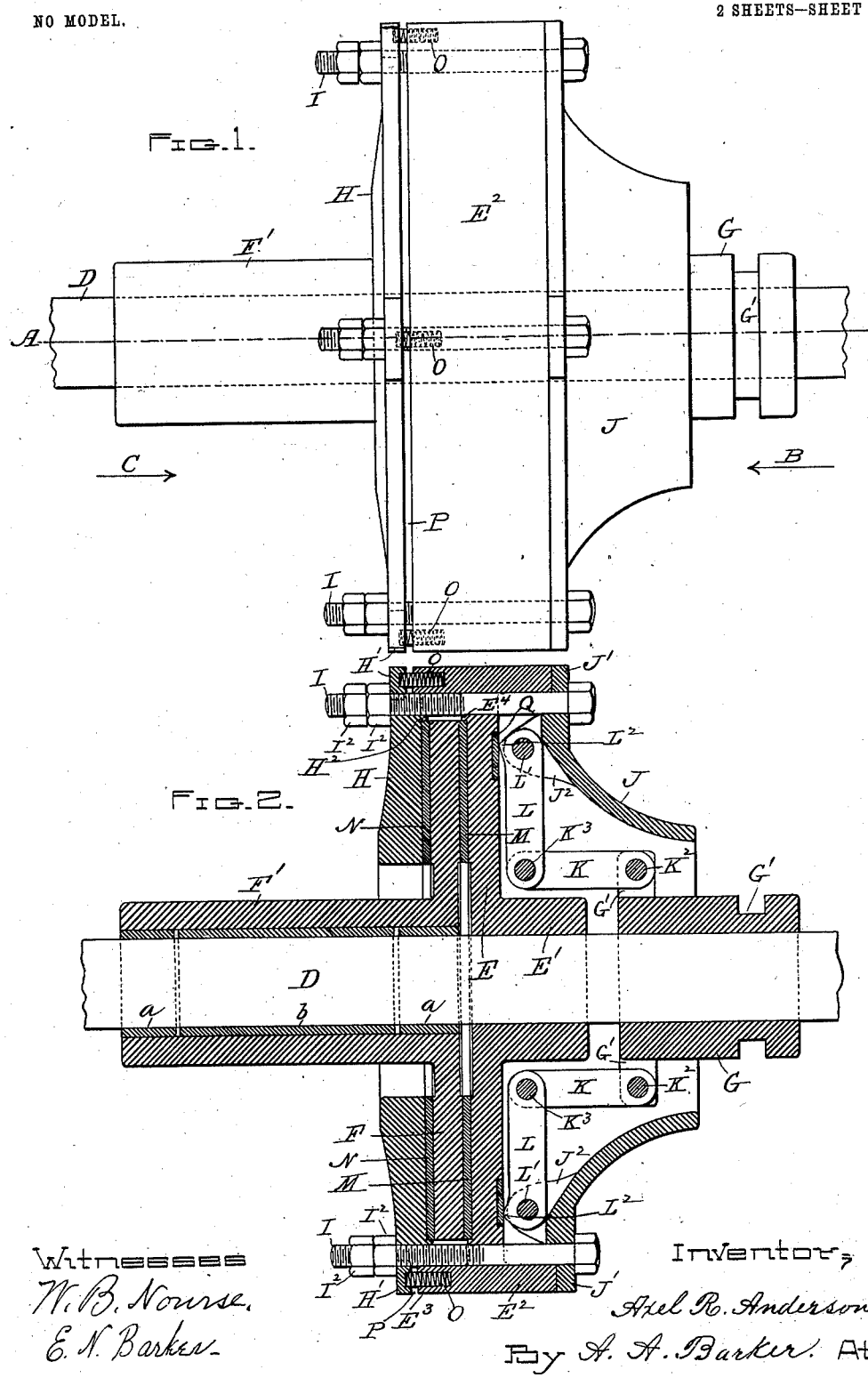
Witnesses
W. B. Nourse.
E. N. Barker.
Inventor,
Axel R. Anderson.
By A. A. Barker, Att'y.

No. 748,569. PATENTED JAN. 5, 1904.
A. R. ANDERSON.
FRICTION CLUTCH.
APPLICATION FILED JULY 7, 1902.
NO MODEL. 2 SHEETS—SHEET 2.
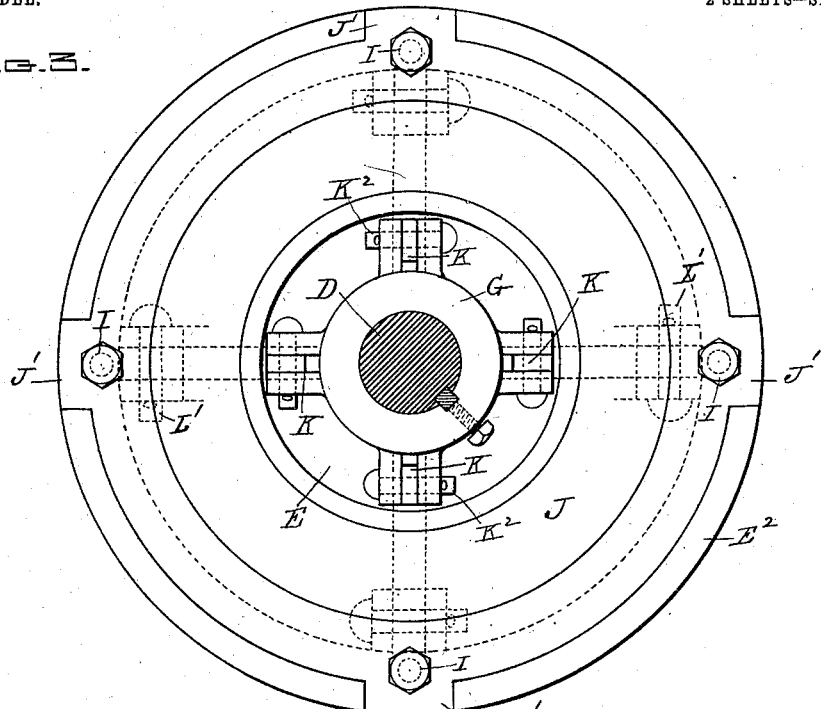
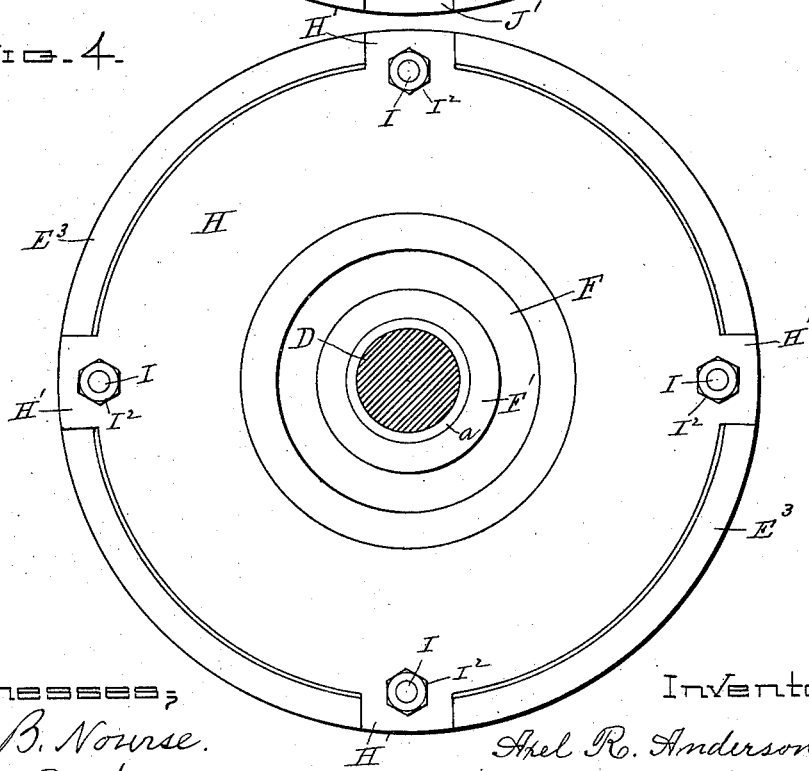
Witnesses:
W. B. Nourse.
E. N. Barker.
Inventor,
Axel R. Anderson.
By A. A. Barker. Att'y.

No. 748,569.                                           Patented January 5, 1904.

UNITED STATES PATENT OFFICE.

AXEL R. ANDERSON, OF WORCESTER, MASSACHUSETTS.

FRICTION-CLUTCH.

SPECIFICATION forming part of Letters Patent No. 748,569, dated January 5, 1904.

Application filed July 7, 1902. Serial No. 114,539. (No model.)

*To all whom it may concern:*

Be it known that I, AXEL R. ANDERSON, of the city and county of Worcester and State of Massachusetts, have invented certain new and useful Improvements in Friction-Clutches; and I do hereby declare that the following is a full, clear, and exact description thereof, reference being had to the accompanying drawings, forming a part of this specification, and in which—

Figure 1 represents a top or plan view of a friction-clutch embodying my improvements. Fig. 2 is a central longitudinal section therethrough taken on line A, Fig. 1. Fig. 3 is a transverse section through the shaft to which the clutch is applied, showing a side view of said clutch looking in the direction of arrow B; and Fig. 4 is a similar transverse section through said shaft, showing the opposite side view of the clutch looking in the direction of arrow C.

The object of my invention is to provide a friction-clutch of simple and inexpensive construction and which shall be effective in use; and it consists in the combination of certain specific elements to effect said result, as will be hereinafter more fully set forth.

In order that others may better understand the nature and purpose of my said invention, I will now proceed to describe it more in detail.

In the drawings, D represents the shaft upon which the clutch is mounted. To said shaft is rigidly secured the wheel E, having the hub E' and peripheral rim E$^2$. A wheel F and hub G are also mounted on said shaft, the wheel F being fitted loose on the shaft and the hub G fitted to slide longitudinally, but not to turn thereon. The wheel F is provided with a long bearing-hub F', (to receive the usual driving-pulleys, not shown,) which is preferably lined with brass bushings $a\ a$ and $b$, the bushings $a\ a$ being fitted tight, and the bushing $b$ loose therein, said loose bushing being for the purpose of reducing the friction, and the tight bushings $a\ a$, which are arranged at each end of bushing $b$, are for holding said bushing $b$ in position longitudinally. The bushings $a\ a$ are made a tight fit in hub F', so that when driven in they are held by friction only in this instance; but they may be fastened in any other suitable manner, if desired.

Outside of wheel F, over its hub F', is arranged a ring H, whose periphery fits inside of the flanges E$^3$ of rim E$^2$ and which is provided at different points around its periphery with radially-projecting ears H', four in this instance, which project over the edge of said flange E$^3$ and are each provided with a threaded longitudinal opening to receive the holding-bolts I, as will be hereinafter described. On the opposite side of wheels E F from ring H is arranged a tunnel-shaped ring J, whose outer edge is provided with ears J', having openings to receive the longitudinal holding-bolts I in a similar manner to the ring H. From said outer edge the ring J curves inward and longitudinally in the opposite direction from ring H and serves as a guard to cover the connecting-links K L for connecting the sliding shipper-hub G with said ring J, the outer end of link K being pivoted by means of a bolt K$^2$ to a suitable bearing G' on the sliding shipper-hub G, its inner end pivoted by means of a bolt K$^3$ to the end of link L, and said link L in turn pivoted by means of a bolt L' to a bearing J$^2$ on curved ring J. A pair of links is arranged to come in radial alinement with each set of ears H' J' and bolts I, as is shown in the drawings. Said bolts are passed transversely through the ears H' J' and wheel E in the direction parallel to shaft D and the parts are held by means of set-nuts I$^2$ I$^2$.

Between wheels E and F and between wheel F and ring H are respectively arranged friction-disks M and N, the same fitting inside of annular flanges E$^4$ and H$^2$, formed, respectively, on the inner sides of said wheels E and F and serving to hold said friction-disks in position laterally. In practice said friction-disks are preferably made of wood; but I do not limit myself thereto.

Friction is applied to clutch the wheel F and driving-pulley, which is in practice mounted on its hub F', so as to be turned by shaft D by moving the shipper-hub G longitudinally in the direction from the clutch, and vice versa, for removing said driving power. The shipper, which is not shown, is adapted to engage at its upper end with the annular notch G' of hub G. When said hub G is thus operated in the direction from the clutch, the links K L are drawn outward, as will be apparent by reference to the drawings, thereby bringing a cam projection L² on the inner edge of each link L, near its pivot L', in contact with the side of fixed wheel E, and thus serves as a bearing or purchase against said wheel in drawing the ring H and other parts into close frictional contact by means of the bolts I. In order that said ring may be moved back into its normal position to release said frictional contact when the shipper is moved toward the clutch, I arrange suitable springs in the device for forcing said ring H outward when the draft of the bolts is removed. In this instance this is done by fitting spiral springs O in suitable openings in the rim of wheel E, one near each holding device. To admit of said operation of ring H in applying and removing the frictional contact, as aforesaid, an annular space P is provided between the edge of rim E² and the ears H', formed on said ring H, (see Figs. 1 and 2,) thereby permitting the ring to be drawn inward by the bolts and also to be forced outward by the springs O for the purpose stated. A disk or plate Q, of chilled or tempered steel, is preferably set flush in the side of wheel E at each bearing-point of the cam projections L² on links L to prevent undue wear upon said wheel; but I do not limit myself thereto.

It will be apparent that a very strong and effective friction-clutch is produced by my improved construction. A clutch thus made is not only strong and durable, but is comparatively inexpensive in construction. By the employment of the ears H' and J' the lateral strain upon the bolts is wholly removed, and the guard provided by constructing the ring J as shown and described removes any possibility of injury to the attendant by getting caught in the link mechanism and also protects said mechanism itself from dust and injury. I have fully demonstrated the practicability and advantages stated of my invention by the actual use of clutches made in conformity therewith, and they are conceded to embody the advantages claimed therefor. I am aware that other friction-clutches have been patented somewhat similar in construction to mine, and I therefore limit my invention to the specific combination of elements set forth and pointed out in the claims.

Having now described said invention, what I claim therein as new, and desire to secure by Letters Patent, is—

In a friction-clutch, the combination of shaft D, fixed wheel E and loose wheel F, both mounted thereon, springs O, interposed between said fixed wheel E and ring H, said ring H, fitted against the outside of the loose wheel over the hub thereof, ring or hood J arranged at the opposite side of the clutch outside of the fixed wheel E, over its hub and part of the shipper-hub, longitudinal holding-bolts I passed transversely through the outer edges of said wheel E, ring H, and ring or hood J, the holding-nuts thereof, longitudinal links K pivoted at their outer ends to shipper-hub G, and at their inner ends to the inner ends of transverse links L, said links L, pivoted at their outer ends to suitable lugs on the inner surface of ring or hood J near the outer edge thereof, said links L being each provided with a cam projection L² at its outer end on the side next to fixed wheel E and adapted to bear against the side thereof, so that when the shipper is moved in the direction from the clutch, the tight and loose wheels will be clamped in tight contact through the connecting-rods L, substantially as and for the purpose set forth.

AXEL R. ANDERSON.

Witnesses:
A. A. BARKER,
W. B. NOURSE.